United States Patent
Lee et al.

(10) Patent No.: US 7,616,596 B2
(45) Date of Patent: Nov. 10, 2009

(54) APPARATUS AND METHOD OF DETERMINING UPLINK PRIORITY IN WIRELESS MOBILE COMMUNICATION SYSTEM

(75) Inventors: Young-Soon Lee, Yongin-si (KR); Byung-Chan Ahn, Seoul (KR)

(73) Assignee: Samsung Electronics Co., Ltd (KR)

( * ) Notice: Subject to any disclaimer, the term of this patent is extended or adjusted under 35 U.S.C. 154(b) by 324 days.

(21) Appl. No.: 11/586,760

(22) Filed: Oct. 26, 2006

(65) Prior Publication Data

US 2007/0099647 A1    May 3, 2007

(30) Foreign Application Priority Data

Oct. 27, 2005   (KR) ...................... 10-2005-0101832

(51) Int. Cl.
*H04J 3/08*    (2006.01)
(52) U.S. Cl. ...................... 370/326; 370/318; 370/328; 455/517; 455/450
(58) Field of Classification Search ................. 370/329, 370/328, 252; 375/260, 295; 702/189; 455/450, 455/69, 522, 452.1
See application file for complete search history.

(56) References Cited

U.S. PATENT DOCUMENTS

| 6,317,435 | B1 | 11/2001 | Tiedemann, Jr. et al. |
| 2002/0012332 | A1* | 1/2002 | Tiedemann et al. .......... 370/335 |
| 2002/0177447 | A1* | 11/2002 | Walton et al. ............... 455/452 |
| 2003/0100267 | A1* | 5/2003 | Itoh et al. ..................... 455/69 |
| 2005/0059421 | A1 | 3/2005 | Reed et al. |

FOREIGN PATENT DOCUMENTS

| KR | 1020030001205 | 1/2003 |
| KR | 1020050023187 | 3/2005 |
| KR | 1020050041207 | 5/2005 |
| WO | WO 02/078241 | 10/2002 |

* cited by examiner

*Primary Examiner*—George Eng
*Assistant Examiner*—Nizar Sivji
(74) *Attorney, Agent, or Firm*—The Farrell Law Firm, LLP

(57) ABSTRACT

Provided is a wireless mobile communication system in which a mobile station reports a headroom value indicating the magnitude of currently used transmission power and additionally usable transmission power. An uplink scheduling method of a Base Transceiver Station (BTS) includes normalizing the headroom value according to a pre-set reference transmission format; determining a mean data rate of the mobile station; and determining a priority of the mobile station considering the normalized headroom value and the mean data rate.

10 Claims, 2 Drawing Sheets

APPARATUS AND METHOD OF DETERMINING UPLINK PRIORITY IN WIRELESS MOBILE COMMUNICATION SYSTEM

PRIORITY

This application claims priority under 35 U.S.C. §119 to an application filed in the Korean Intellectual Property Office on Oct. 27, 2005 and assigned Ser. No. 2005-101832, the contents of which are incorporated herein by reference.

BACKGROUND OF THE INVENTION

1. Field of the Invention

The present invention relates generally to a wireless mobile communication system, and in particular, to an apparatus and method for a base transceiver station (BTS) to determine a priority for uplink scheduling of a mobile station in a wireless mobile communication system.

2. Description of the Related Art

Since a scheduling method is not used in an uplink of a conventional wireless mobile communication system, i.e., a Code Division Multiple Access (CDMA) communication system, priority does not have to be determined for mobile stations. Instead, using a transmission rate control method, interference control of the mobile stations is performed, and a data rate of each mobile station is determined. Herein, the transmission rate control method is a method of increasing or decreasing a data rate of all mobile stations en bloc according to the amount of interference in a cell. That is, a Base Transceiver Station (BTS) of a CDMA communication system controls data rates of mobile stations according to a variation of Rise over Thermal (RoT), which is a ratio of a sum of self-cell interference, other-cell interference, and thermal noise to the thermal noise so that transmission power of all mobile stations can reach the BTS as constant receive power regardless of distances between the BTS and the mobile stations.

In more detail, each BTS of the CDMA communication system measures a sum of signal interference (RoT) in a self-cell, signal interference from other cells, and thermal interference, and if the total interference exceeds a pre-set threshold, the BTS reduces the effect of signal interference by decreasing en bloc a data rate of mobile stations placed in the coverage thereof, and if the total interference does not exceed the pre-set threshold, the BTS increases the effect of signal interference by increasing en bloc the data rate of the mobile stations placed in the coverage thereof so that the amount of interference (RoT) in the self-cell is maintained within a predetermined range. This method is effective since most of the amount of interference of each BTS is signal interference in a self-cell in an uplink of the CDMA communication system. Because of this, the interference in a self-cell of the CDMA communication system can be directly controlled by controlling the data rate of all mobile stations in the cell. Thus, since interference of the entire communication system can be controlled by each BTS controlling only signal interference in a self-cell, a data rate of each mobile station can be guaranteed at a predetermined level.

However, in a broadband wireless access communication system or a 2.3 GHz portable Internet (WiBro) communication system based on the IEEE 802.16e standard, which has been developed and available on the market as a next generation mobile communication system, the method guaranteeing data rate cannot be applied according to a system characteristic. That is, since most of the amount of interference in an uplink of the system is signal interference from other cells, i.e., since interference in a self-cell can be ignored, it is difficult for each BTS to directly control the other cell interference as in the CDMA communication system.

Characteristics of the broadband wireless access communication system and the portable Internet communication system, which can be distinguished from the conventional CDMA communication system, will be described. Hereinafter, for convenience of description, the broadband wireless access communication system or the portable Internet communication system is called a WiBro communication system.

First, in the WiBro communication system, a BTS performs a ranging process between mobile stations so that signals transmitted from different mobile stations arrives at the BTS at the same time and controls each of the mobile stations to insert a cyclic prefix field into data bursts to be transmitted so that signals arriving at the BTS at different times through multiple paths do not interfere with each other. In addition, since the WiBro communication system uses the Orthogonal Frequency Division Multiple Access (OFDMA) scheme, orthogonality exists between subcarriers. Thus, a signal of a mobile station to which a specific slot is allocated does not interfere with a signal of another mobile station to which another slot is allocated.

Secondly, in the WiBro communication system, since an uplink is constituted with diversity subchannels, adjacent BTSs use different subchannels.

Based on the characteristic of the WiBro communication system, the transmission rate control method applied to the conventional CDMA communication system cannot be applied to the WiBro communication system. In addition, since a high transmission rate can be obtained for a mobile station located near a BTS using maximum transmission power, the scheduling method is more suitable for the mobile station located near the BTS than the transmission rate control method.

SUMMARY OF THE INVENTION

Accordingly, an object of the present invention is to provide an apparatus and method of determining a priority of a mobile station in an uplink scheduling method of a wireless mobile communication system.

Another object of the present invention is to provide an uplink scheduling apparatus and method for guaranteeing a fair and high data rate to a mobile station in a wireless mobile communication system.

According to one aspect of the present invention, there is provided an uplink scheduling method of a Base Transceiver Station (BTS) in a wireless mobile communication system in which a mobile station reports a headroom value indicating the amount of currently used transmission power and additionally usable transmission power to the BTS, the method including normalizing the headroom value according to a pre-set reference transmission format; determining a mean data rate of the mobile station; and determining a priority of the mobile station considering the normalized headroom value and the mean data rate.

According to another aspect of the present invention, there is provided an uplink scheduling apparatus of a Base Transceiver Station (BTS) in a wireless mobile communication system in which a mobile station reports a headroom value indicating the amount of currently used transmission power and additionally usable transmission power to the BTS, the apparatus including an uplink scheduler for normalizing the headroom value according to a pre-set reference transmission format, determining a mean data rate of the mobile station and determining a priority of the mobile station considering the normalized headroom value and the mean data rate.

BRIEF DESCRIPTION OF THE DRAWINGS

The above and other objects, features and advantages of the present invention will become more apparent from the following detailed description when taken in conjunction with the accompanying drawing in which.

DETAILED DESCRIPTION OF THE PREFERRED EMBODIMENT

Figure 1:
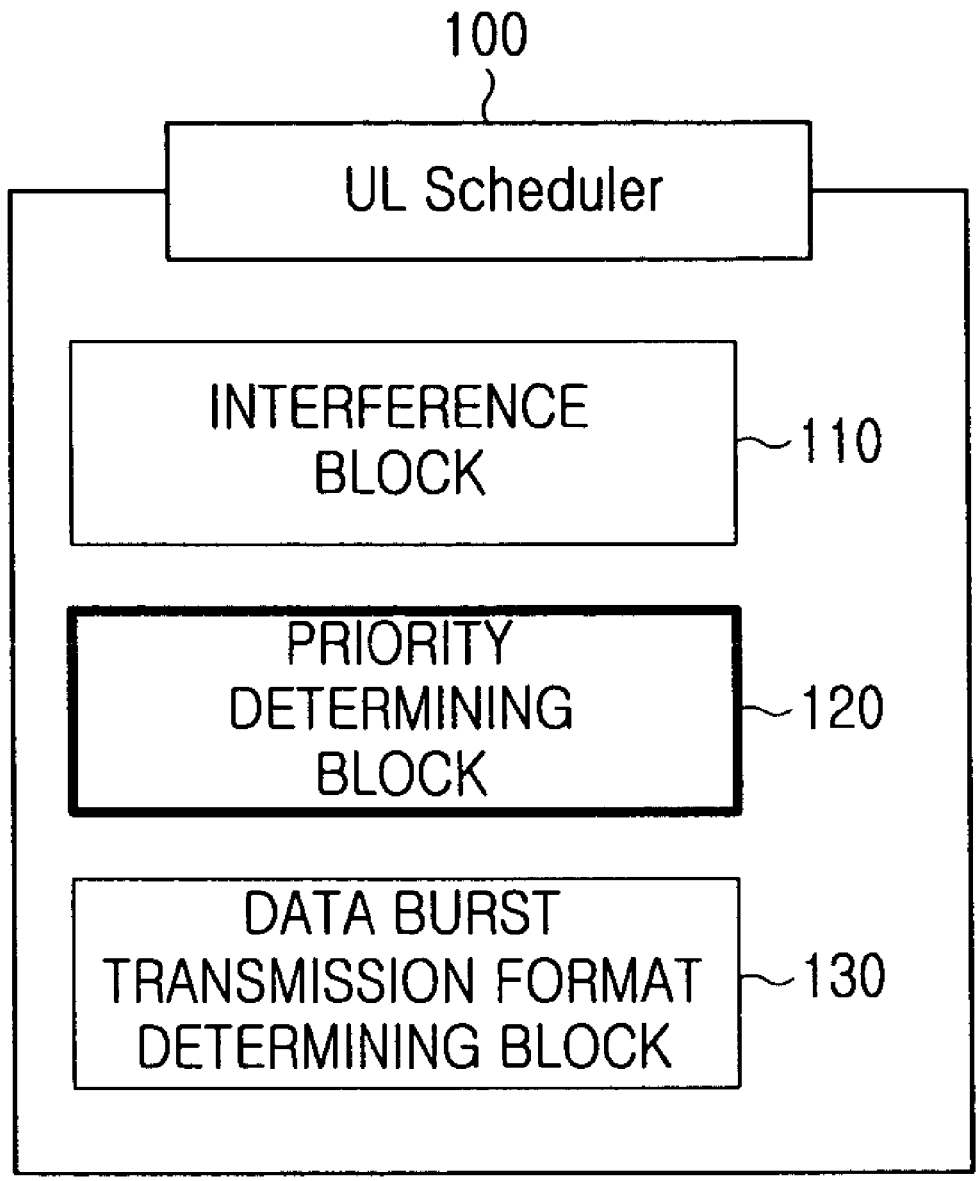
FIG. 1 is a structure of an uplink scheduler in a wireless mobile communication system.

Preferred embodiments of the present invention will be described herein below with reference to the accompanying drawings. In the following description, well-known functions or constructions are not described in detail since they would obscure the invention in unnecessary detail.

The present invention provides a new method of determining priority in uplink scheduling of a wireless mobile communication system.

In more detail, the uplink priority determining method is based on a Proportional Fair (PF) scheduling method. However, since the PF scheduling method cannot be applied to an IEEE 802.16 or portable Internet (WiBro) communication system as it is, in the present invention, a new expression of an existing PF scheduling priority calculation method is provided so that the new expression can be applied to an uplink.

The PF scheduling method considers a data rate according to a channel state between a Base Transceiver Station (BTS) and each mobile station and is mainly used for downlink systems. That is, in a downlink, since a BTS can directly detect a channel state from a Channel Quality Indicator (CQI) transmitted from each mobile station, the BTS can immediately use the detected channel states for the PF scheduling. On the contrary, in an uplink, since information such as the CQI does not exist, a method for matching a channel state to a data rate is required to determine priority. Since headroom indicating a distance and a channel state between a BTS and a mobile station is defined in the IEEE 802.16e standard, an uplink scheduling method and priority can be determined using the headroom. An uplink scheduling priority determining method according to the present invention will be described.

A BTS can determine priorities of mobile stations to which resources are allocated by normalizing headroom values reported from the mobile stations to pre-set a modulation method, a coding rate, and the number of subchannels, determining a final headroom value from the normalized headroom values considering signal to interference and noise ratios (SINRs) required for Modulation and Coding Schemes (MCSs) to be allocated to the mobile stations, and determining a mean data rate of each mobile station based on the final headroom value.

The present invention can be preferably applied to broadband wireless access communication systems using the OFDMA scheme and a portable Internet (WiBro) service using a 2.3 GHz band and communication systems in which headroom information is transmitted to a BTS. Hereinafter, as mentioned above, for convenience of description the broadband wireless access communication system or the portable Internet service is called a WiBro communication system.

Prior to description of the present invention, a data transmission structure of the WiBro communication system will be described. Data transmission of the WiBro communication system is accomplished in a frame basis, and each frame is divided into a duration for transmitting downlink data and a duration for transmitting uplink data. The uplink and downlink data durations are divided again based on a frequency axis and a time axis. Each element divided based on two-dimensional arrangement of the frequency axis and the time axis is called a slot. In the WiBro communication system, uplink wireless resources are shared by dynamically allocating the slots to a plurality of mobile stations.

FIG. 1 is a structure of an uplink (UL) scheduler 100 in the WiBro communication system.

Referring to FIG. 1, the UL scheduler 100 includes an interference block 110, a priority determining block 120, and a data burst transmission format determining block 130.

The interference block 110 maintains an interference signal amplitude affecting adjacent mobile stations at a predetermined level by controlling the maximum MCS level used for data transmission of each mobile station and thus guarantees a data rate and the maximum throughput of each mobile station.

The priority determining block 120 selects a mobile station having the highest priority for allocation of wireless resources from among a plurality of mobile stations, which has requested uplink scheduling.

The data burst transmission format determining block 130 determines a data burst transmission format considering a current channel state and usable transmission power of each mobile station. Herein, the data burst transmission format indicates an MCS level to be used and the number of slots to be allocated for data burst transmission.

The present invention is related to a method of determining a priority of a mobile station, which is performed by the priority determining block 120, and thus, detailed description of the interference block 110 and the data burst transmission format determining block 130 will be omitted.

The UL scheduler 100 performs hierarchically distinctive scheduling according to a type of data burst information, i.e., control information, general data information, information based on a high or low Quality of Service (QoS) request, to be transmitted from a mobile station.

The UL scheduler 100 must first allocate slots to mobile stations desiring to transmit a control information and bandwidth request according to a round-robin scheduling method.

In addition, the UL scheduler 100 allocates slots to mobile stations desiring to transmit information including a delay limitation request, such as an Unsolicited Grant Service (UGS), a real-time Polling Service (rtPS), or an extended real-time Polling Service (ertPS), according to a QoS scheduling method.

Finally, the UL scheduler 100 allocates the remaining slots to mobile stations desiring to transmit information including a slight delay limitation request or no delay limitation request, such as a non-real-time Polling Service (nrtPS) or a Best Effort (BE) service, according to a General Fair (G-Fair) scheduling method.

Priority calculations suggested in the present invention can be applied to information including a slight delay limitation request or no delay limitation request, such as the nrtPS or the BE service, using the G-Fair scheduling method.

The PF scheduling method, which is fundamental to the method of determining priority in uplink scheduling of a WiBro communication system that is suggested in the present invention, will be first described.

As described above, the PF scheduling method is a method of detecting channel states between a BTS and mobile stations and determining priorities of the mobile stations so that fairness and the maximum processing rate of each mobile station can be guaranteed and is mainly used for downlink scheduling of the WiBro communication system. Each mobile station measures the amplitude of a downlink pilot or preamble signal, detects a channel state from the measured result, and reports the detected channel state to the BTS in a CQI format. The BTS extracts the channel state of each mobile station from the CQIs and allocates a data rate according to the extracted channel state to each mobile station. That is, the PF scheduling method can determine priorities of mobile stations requesting scheduling by allocating different data rates to the mobile stations according to channel variations between the BTS and the mobile stations. Equation (1) indicates a basic PF scheduling priority calculation formula used for downlink scheduling, wherein scheduling is performed in an order of higher priority.

$$Priority_{PF,DL} = \frac{\text{Data\_Rate}(CQI)}{E(\text{data rate})} \quad (1)$$

In Equation (1), Data_Rate(CQI) denotes a data rate that can be allocated to a mobile station after detecting a channel variation considering a CQI reported from the mobile station, and E(data rate) denotes a mean data rate of each mobile station.

However, the downlink scheduling method cannot be used to determine priority for uplink scheduling. Since the amount of interference and a transmission power value per tone are fixed in the downlink of the WiBro communication system, the BTS can compare channel states of the mobile stations to each other considering CQIs fed back from the mobile stations. However, since the amount of signal interference is variable in the uplink of the WiBro communication system, even if the mobile stations have the same performance, a transmission power value of each mobile station varies according to how many subchannels or slots are used. Thus, the BTS cannot detect a channel state of each mobile station using the same method as the downlink.

Instead, the BTS can determine a channel state of each mobile station using transmission power of the mobile station in the uplink. That is, the BTS determines priorities of mobile stations by indirectly estimating the channel states using headroom information of the mobile stations and allocating different data rates to the mobile stations based on the estimated channel states. The headroom information is information informing the BTS of the magnitude of currently used transmission power and additionally usable transmission power of each mobile station. The headroom information is defined as information not periodically transmitted to the BTS by each mobile station in every frame but information transmitted to the BTS by each mobile station when a specific condition is satisfied.

A method of determining WiBro uplink scheduling priority using headroom information will now be described.

The WiBro uplink scheduling priority is basically based on the conventional PF scheduling method using a ratio of information for determining a channel state to a mean data rate. However, by replacing a data rate according to a CQI used to determine a channel state with a data rate using headroom information, the PF scheduling method can be used for uplink scheduling. A weighting factor is additionally considered for the PF scheduling method.

The BTS receives headroom information from a plurality of mobile stations and normalizes the headroom information of each mobile station to a headroom value under the same condition. That is, each received headroom value is converted to a headroom value according to a pre-set reference transmission format, and the converted headroom value is divided by a mean data rate of each mobile station. The headroom value conversion is performed since, when a mobile station reports to the BTS a high headroom value due to allocation of a low MCS level (when a channel state is not good) and when a mobile station reports to the BTS a low headroom value due to allocation of a high MCS level (when a channel state is good), the BTS may wrongly determine that the mobile station in the latter case has a bad channel state based on the low headroom value even though the mobile station in the latter case has a good channel state.

Thus, since correctness and fairness decrease if two headroom values are directly compared with each other, the headroom values are converted headroom values of the reference transmission format in order to guarantee the fairness of comparison. Accordingly, in order to normalize headroom values under the same conditions, the reference transmission format is assumed that, for example, a modulation method is a Quadrature Phase Shift Keying (QPSK) modulation method and a coding rate is ½. In addition, it is assumed that the reference transmission format uses a single slot in a frequency domain.

The method of determining a priority in uplink scheduling of a WiBro communication system will now be described in more detail using the following equations. Equation (2) represents the WiBro uplink priority determining method based on the above description.

$$Priority_{UL} = \frac{\text{Data\_Rate}(SINR)}{E(\text{data rate})^\alpha} \times U_{min,nrtPS} \times U_{max} \times W \quad (2)$$

In Equation (2), Data_Rate(SINR) denotes a current channel state of a mobile station using a date rate corresponding to an SINR, E(data rate) denotes a mean data rate of the mobile station, $\alpha$ denotes a fairness exponent value for fair scheduling, and $U_{min,nrtPS}$ denotes a factor for reflecting a minimum reserved traffic rate. $U_{max}$ denotes a value for reflecting a maximum sustained traffic rate, and W is a weighting factor.

As described above, the equation for calculating priority in the present invention employs a factor considering a QoS parameter of the nrtPS type, a traffic priority factor for weights between connections, and a fairness exponent factor for guaranteeing the fairness.

In Equation (2), $U_{min,nrtPS}$ can be represented by Equation (3), which has a value of 1 for a BE connection.

$$U_{min,nrtPS} = \begin{cases} 1 + W_x \times \frac{X_{reserved}}{\overline{X_{reserved}}} & \text{for } nrtPS \\ 1 & \text{for } BE \end{cases} \quad (3)$$

In Equation (3), $\overline{X_{reserved}}$ denotes the size of information bits to be transmitted every unsolicited polling interval in order to satisfy the minimum reserved traffic rate, $X_{reserved}$ denotes a value selected as the maximum value between 0 and a value obtained by subtracting the number of information bits transmitted when selected and a subchannel (or slot) is allocated from a value increased by $\overline{X_{reserved}}$ every unsolicited polling interval, and $W_x$ denotes a weight factor.

Equation (3) increases a priority of a connection, which does not transmit a data amount corresponding to the minimum reserved traffic rate every unsolicited polling interval, among connections related to the nrtPS.

In Equation (2), $U_{max}$ denotes a value for reflecting a maximum sustained traffic rate. That is, $U_{max}$ is determined by comparing the E(data rate) value of a mobile station to the data size $EPsize_{max\ sustained\ traffic\ rate}$ transmitted per frame when data is transmitted at the maximum sustained traffic rate. This can be represented by Equation (4).

$$U_{max} = \begin{cases} 1 & \text{if } E(datarate) \leq EPsize_{max\ sustained\ traffic\ rate} \\ 0 & \text{else} \end{cases} \quad (4)$$

As described above, W denotes a weight factor for reflecting a traffic priority according to connection and can be calculated using a traffic priority T (having a value of [0, 7]) defined by the IEEE 802.16e standard. That is, if an aggregate bandwidth request value is greater than 0, it is determined as $W=2^T$ using T determined as a value transmitted in service negotiation, and if the aggregate bandwidth request value is 0, $W=0$.

As a reference, when a priority of each mobile station is calculated using Equation (2), the mobile station becomes a scheduling target only if the calculated value $Priority_{UL}$ is non-zero.

The PF scheduling method (the first term of Equation (2)), which is the most basic in Equation (2), will now be described in more detail. Equation (5) represents the PF scheduling method which is the most basic to determine a priority in the WiBro uplink scheduling. That is, the BTS selects a mobile station for first scheduling according to a value obtained by dividing a data rate Data_Rate(SINR) corresponding to a current SINR by the mean data rate E(data rate) of the mobile station.

$$Priority_{UL} = \frac{\text{Data\_Rate(SIN}R\text{)}}{E(\text{data rate})} \quad (5)$$

In Equation (5), the SINR value is obtained by the BTS under the same condition of the mobile stations (a condition of using a single or the same slot). That is, the SINR value is a value indicating a channel state of each mobile station at a current scheduling time and is an SINR value measured per slot, and thus, the numerator of Equation (2) can be represented by Equation (6).

$$Priority_{PF,UL\_numerator} = \text{Data\_Rate(SINR}_{slot}) \quad (6)$$

Since the uplink of the WiBro communication system uses a diversity channel allocation method, the amount of interference for all slots is almost the same. The diversity channel allocation method is a method of creating a plurality of diversity subchannels by grouping a plurality of subcarriers existing in the entire frequency band by mixing the plurality of subcarriers in a different method for each BTS (or sector) and allocating the created diversity subchannels to mobile stations. Thus, since the same amount of interference per slot exists, the SINR value per slot in Equation (6) is proportional to the amplitude $S_{slot}$ of a signal per slot. In addition, since the amplitude of a signal per slot is proportional to a headroom value reported from each mobile station to the BTS when each mobile station uses the same reference transmission format, Equation (6) can be represented by a data rate of a headroom value per slot as shown in Equation (7).

$$Priority_{PF,UL\_numerator} = \text{Data\_Rate(SINR}_{slot}) \quad (7)$$
$$\approx \text{Data\_Rate}(S_{slot})$$
$$\approx \text{Data\_Rate}(Headroom_{slot})$$

As described above, the BTS must convert the headroom value reported from each mobile station as shown in Equation (7) to a headroom value according to the reference transmission format (QPSK, ½, and single slot) and use the converted headroom values for the priority determination. Thus, Data_Rate($Headroom_{slot}$) of Equation (7), which is a data rate according to the amount of headroom, is converted to the reference transmission format as shown in Equation (8).

$$Priority_{UL\_numerator} \approx \text{Data\_Rate}(Headroom_{slot}) = \text{Data\_Rate}(QPSK\_½) \times N_{slot}(Headroom, QPSK\_½) \quad (8)$$

Equation (9) is a general case of Equation (8).

$$Priority_{UL\_numerator} = \text{Data\_Rate}(MCS_{previous}) \times N_{slot}(Headroom, MCS_{previous}) \quad (9)$$

Equation (9) is obtained by assuming that a mobile station requesting scheduling uses an arbitrary transmission format, i.e., an MCS level and the number of allocated slots used in a previous frame and represents a data rate according to a reported headroom value. In Equation (9), $MCS_{previous}$ and $N_{slot}(Headroom, MCS_{previous})$ indicate the MCS level and the number of allocated slots used in the previous frame, respectively. Thus, in order to normalize a headroom value reported from each mobile station according to the reference transmission format at a scheduling time based on Equation (9), a Modulation order×Coding Rate (MPR) between the MCS level used in the previous frame and an MCS level of the reference transmission format (it is assumed as QPSK, ½ in the present invention) must be considered. That is, in order to normalize a data rate corresponding to the previous MCS level to a data rate corresponding to QPSK, ½ (that is, a reference MCS level), an MPR difference between the two MCS levels must be considered (as shown in Equation (10)). In addition, when the number of allocated slots is converted, the MPR difference must be considered first, and an SINR value difference required per MCS level ($SINR_{req}$) must be additionally considered (as shown in Equation (11)) since the number of slots to be allocated per MCS level is limited. Equations (10) and (11) represents a process of normalizing an arbitrary MCS level and an arbitrary number of slots to an MCS level and the number of slots according to the reference transmission format.

$$\text{Data\_Rate}(MCS_{previous}) = \text{Data\_Rate}(QPSK\_1/2) \cdot \frac{MPR(MCS_{previous})}{MPR(QPSK\_1/2)} \quad (10)$$

$$N_{slot}\left(\begin{array}{c}Headroom, \\ MCS_{previous}\end{array}\right) = N_{slot}(Headroom, QPSK\_1/2) \cdot \qquad (11)$$
$$\frac{MPR(QPSK\_1/2)}{MPR(MCS_{previous})} \cdot$$
$$\left\{\begin{array}{c}\frac{SINR_{req}(QPSK\_1/2)}{SINR_{req}(MCS_{previous})} \cdot \\ \frac{MPR(QPSK\_1/2)}{MPR(MCS_{previous})}\end{array}\right\}$$

Using Equations (10) and (11), Equation (9) can be represented by Equation (12).

$$Priority_{UL\_numerator} = Data\_Rate(MCS_{previous}) \times \qquad (12)$$
$$N_{slot}(Headroom, MCS_{previous})$$
$$= Data\_Rate(QPSK\_1/2) \times$$
$$N_{slot}(Headroom, QPSK\_1/2) \cdot$$
$$\left\{\begin{array}{c}\frac{SINR_{req}(QPSK\_1/2)}{SINR_{req}(MCS_{previous})} \cdot \\ \frac{MPR(MCS_{previous})}{MPR(QPSK\_1/2)}\end{array}\right\}$$

Thus, Equation (5) can be represented by Equation (13) using Equation (12), and the WiBro uplink priority determining method of Equation (2) is finally represented by Equation (14) using Equation (13).

$$Priority_{UL} = \frac{\begin{array}{c}Data\_Rate(QPSK\_1/2) \times \\ N_{slot}(Headroom, QPSK\_1/2) \cdot \\ \left\{\begin{array}{c}\frac{SINR_{req}(QPSK\_1/2)}{SINR_{req}(MCS_{previous})} \cdot \\ \frac{MPR(QPSK\_1/2)}{MPR(MCS_{previous})}\end{array}\right\}\end{array}}{E(\text{Data rate})} \qquad (13)$$

$$Priority_{UL} = \frac{Data\_Rate(SINR)}{E(data\ rate)^{\alpha}} \cdot U_{min,nrtPS} \cdot U_{max} \cdot W \qquad (14)$$
$$= \frac{\begin{array}{c}Data\_Rate(QPSK\_1/2) \cdot \\ N_{slot}(Headroom, QPSK\_1/2) \cdot \\ \left\{\begin{array}{c}\frac{SINR_{req}(QPSK\_1/2)}{SINR_{req}(MCS_{previous})} \cdot \\ \frac{MPR(QPSK\_1/2)}{MPR(MCS_{previous})}\end{array}\right\}\end{array}}{E(data\ rate)^{\alpha}} \cdot U_{min,nrtPS} \cdot$$
$$U_{max} \cdot W$$

That is, in uplink scheduling, the BTS can determine a mobile station to which slots are first allocated using a normalized headroom value for all mobile stations requesting the scheduling, a mean data rate of each mobile station, and a plurality of factors as shown in Equation (14). In addition, by weighting the determined priority to a mobile station requesting QoS, such as the UGS, the rtPS, or the ertPS, requiring no delay, slots are first allocated to the mobile station rather than mobile stations requesting the nrtPS or the BE.

Figure 2:
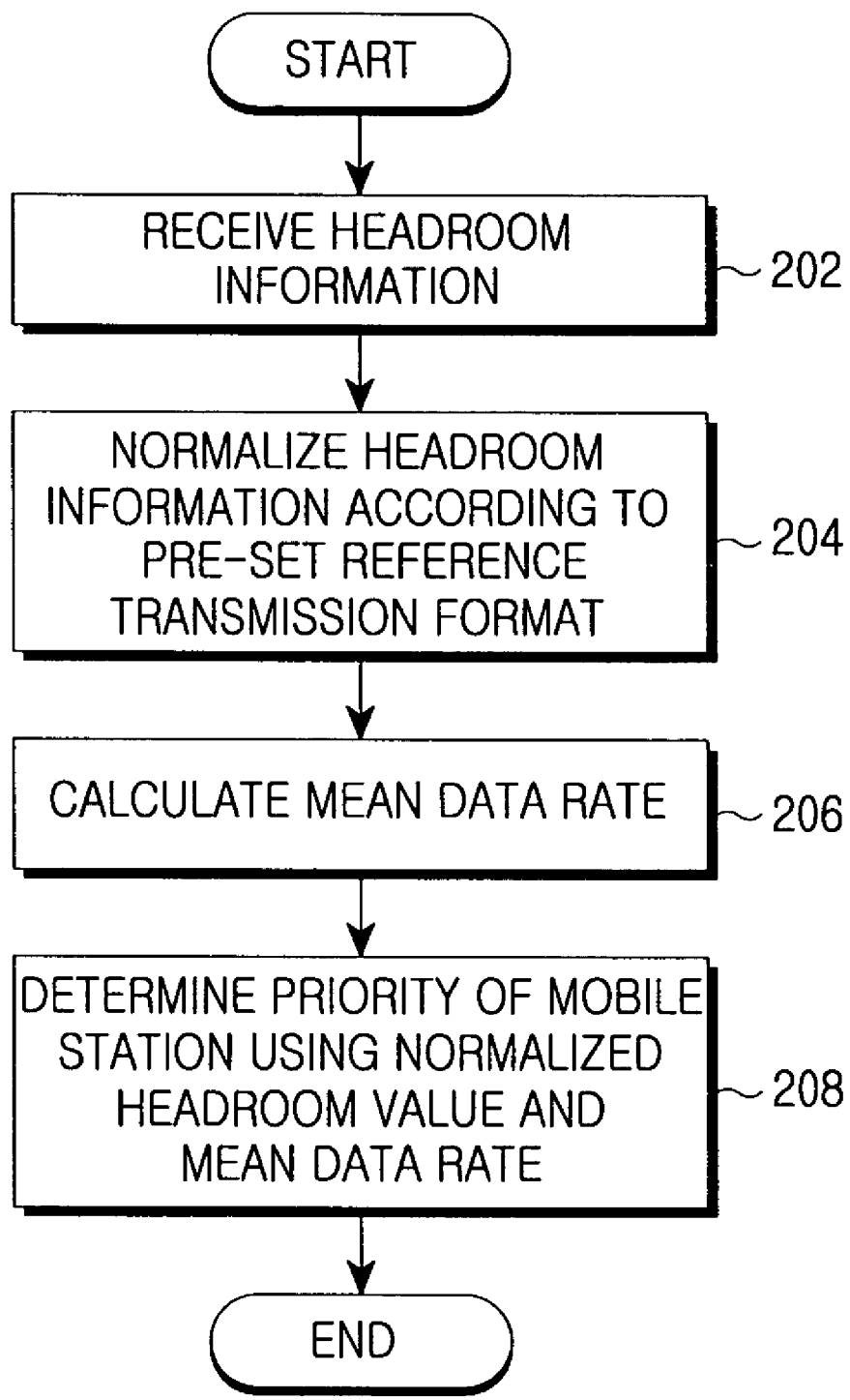
FIG. 2 is a flowchart illustrating a method used by a Base Transceiver Station (BTS) for determining a priority of a mobile station in a wireless mobile communication system according to the present invention.

FIG. 2 is a flowchart illustrating a method used by a BTS for determining priorities of mobile stations in a wireless mobile communication system according to the present invention.

Referring to FIG. 2, the BTS receives headroom information from each mobile station in step 202. It is assumed that the BTS has already known MCS level information and the number of slots, which are previously allocated to each mobile station. The BTS normalizes the received headroom information according to a pre-set reference transmission format such as Equation (9) in step 204. The BTS calculates a mean data rate of each mobile station using an Infinite Impulse Response (IIR) filter until a time frame of a scheduling requesting time of the mobile station in step 206. The BTS determines priorities of the mobile stations considering the determined normalized headroom values and mean data rates using Equation (10) in step 208.

Although steps 204 and 206 are sequentially illustrated for convenience of description, steps 204 and 206 may be simultaneously performed.

As described above, according to the present invention, by determining priorities of mobile stations in uplink scheduling considering headroom information transmitted from each mobile station in a wireless mobile communication system, wireless resources can be allocated to the mobile stations with guaranteeing a fair and high data rate to each mobile station.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. An uplink scheduling method of a Base Transceiver Station (BTS) in a wireless mobile communication system in which a mobile station reports a headroom value to the BTS, the method comprising the steps of:

normalizing the headroom value indicating an amount of currently used transmission power and additionally usable transmission power according to a pre-set reference transmission format;

determining a mean data rate of the mobile station; and determining a priority of the mobile station considering the normalized headroom value and the mean data rate, wherein the pre-set reference transmission format includes at least one of a modulation method, a coding rate, and a number of slots allocated, and wherein the priority of the mobile station is determined using $$Priority_{UL} = \frac{Data\_Rate(SINR)}{E(data\ rate)^{\alpha}} \cdot U_{min,nrtPS} \cdot U_{max} \cdot W$$
$$= \frac{Data\_Rate(QPSK\_1/2) \cdot N_{slot}(Headroom, QPSK\_1/2) \cdot}{E(data\ rate)^{\alpha}} \cdot$$
$$\left\{\frac{SINR_{req}(QPSK\_1/2)}{SINR_{req}(MCS_{previous})} \cdot \frac{MPR(QPSK\_1/2)}{MPR(MCS_{previous})}\right\}$$
$$U_{min,nrtPS} \cdot U_{max} \cdot W,$$

where E(data rate) denotes a mean data rate of the mobile station, SINR denotes a signal to interference and noise ratio, Data Rate(SINR) denotes a current SINR by the E(data rate), $MCS_{previous}$ denotes the MCS previously allocated to the mobile station, Data Rate(QPSK ½) denotes the data rate for the reference MCS level, $N_{slot}$(Headroom, QPSK ½) denotes the number of allocated slots for the normalized headroom value according to the reference MCS level, $$\frac{SINR_{req}(\text{QPSK}\_1/2)}{SINR_{req}(MCS_{previous})}$$

denotes the first difference, MPR denotes Modulation order Product code Rate, $$\frac{MPR(\text{QPSK}\_1/2)}{MPR(MCS_{previous})}$$

denotes the second difference, α denotes a fairness exponent value for fair scheduling, $U_{min,nrtPS}$ denotes a factor for reflecting a minimum reserved traffic rate, $U_{max}$ denotes a value for reflecting a maximum sustained traffic rate, and W denotes a weight factor for reflecting a traffic priority according to connection.

2. The method of claim 1, wherein the step of determining the priority of the mobile station comprises:
   determining a data rate for a reference Modulation and Coding Scheme (MCS) level of the pre-set reference transmission format;
   determining a number of allocated slots for the normalized headroom value according to the reference MCS level;
   determining a first difference between a required Signal to Interference Noise Ratio (SINR) for the reference MCS level and a required SINR for an MCS level used in a previous frame;
   determining a second difference between a Modulation order Product code Rate (MPR) for the reference MCS level and an MPR for the MCS level used in the previous frame; and
   determining the priority of the mobile station by using the data rate for the reference MCS level, the number of allocated slots for the normalized headroom value according to the reference MCS level, the first difference, the second difference and the mean data rate of the mobile station.

3. The method of claim 2, wherein the data rate for the reference MCS level is determined based on a data rate for the MCS level used in the previous frame and the second difference.

4. The method of claim 2, wherein the number of allocated slots for the normalized headroom value according to the reference MCS level is determined based on a number of allocated slots for a headroom value normalized according to the MCS level used in the previous frame, the first difference and the second difference.

5. The method of claim 2, wherein the step of determining the priority of the mobile station comprises:
   determining the priority of the mobile station further based on a factor for reflecting a minimum reserved traffic rate and a value for reflecting a maximum sustained traffic rate.

6. An uplink scheduling apparatus of a Base Transceiver Station (BTS) in a wireless mobile communication system in which a mobile station reports a headroom value to the BTS, the apparatus comprising:
   an uplink scheduler for normalizing the headroom value indicating an amount of currently used transmission power and additionally usable transmission power according to a pre-set reference transmission format, determining a mean data rate of the mobile station and determining a priority of the mobile station considering the normalized headroom value and the mean data rate,
   wherein the pre-set reference transmission format includes at least one of a modulation method, a coding rate, and a number of slots allocated, and
   wherein the unlink scheduler determines priority of the mobile station using $$Priority_{UL} = \frac{\text{Data\_Rate}(SINR)}{E(\text{data rate})^\alpha} \cdot U_{min,nrtPS} \cdot U_{max} \cdot W$$

$$= \frac{\text{Data\_Rate}(\text{QPSK}\_1/2) \cdot N_{slot}(\text{Headroom, QPSK}\_1/2) \cdot \left\{ \frac{SINR_{req}(\text{QPSK}\_1/2)}{SINR_{req}(MCS_{previous})} \cdot \frac{MPR(\text{QPSK}\_1/2)}{MPR(MCS_{previous})} \right\}}{E(\text{data rate})^\alpha}$$

$$U_{min,nrtPS} \cdot U_{max} \cdot W,$$

where E(data rate) denotes a mean data rate of the mobile station, SINR denotes a signal to interference and noise ratio, Data Rate(SINR) denotes a current SINR by the E(data rate), $MCS_{previous}$ denotes the MCS previously allocated to the mobile station, Data Rate (QPSK ½) denotes the data rate for the reference MCS level, $N_{slot}$(Headroom, QPSK ½) denotes the number of allocated slots for the normalized headroom value according to the reference MCS level, $$\frac{SINR_{req}(\text{QPSK}\_1/2)}{SINR_{req}(MCS_{previous})}$$

denotes the first difference, MPR denotes Modulation order Product code Rate, $$\frac{MPR(\text{QPSK}\_1/2)}{MPR(MCS_{previous})}$$

denotes the second difference, α denotes a fairness exponent value for fair scheduling, $U_{min,nrtPS}$ denotes a factor for reflecting a minimum reserved traffic rate, $U_{max}$ denotes a value for reflecting a maximum sustained traffic rate, and W denotes a weight factor for reflecting a traffic priority according to connection.

7. The apparatus of claim 6, wherein the uplink scheduler determines a data rate for a reference Modulation and Coding Scheme (MCS) level of the pre-set reference transmission format, a number of allocated slots for the normalized headroom value according to the reference MCS level, a first difference between a required Signal to Interference Noise Ratio (SINR) for the reference MCS level and a required SINR for an MCS level used in a previous frame, a second difference between a Modulation order Product code Rate (MPR) for the reference MCS level and an MPR for the MCS level used in the previous frame, and the priority of the mobile station based on the data rate for the reference MCS level, the number of allocated slots for the normalized headroom value according to the reference MCS level, the first difference, the second difference and the mean data rate of the mobile station.

8. The apparatus of claim 7, wherein the data rate for the reference MCS level is determined based on a data rate for the MCS level used in the previous frame and the second difference.

9. The apparatus of claim 7, wherein the number of allocated slots for the normalized headroom value according to the reference MCS level is determined based on a number of allocated slots for a headroom value normalized according to the MCS level used in the previous frame, the first difference and the second difference.

10. The apparatus of claim 7, wherein the uplink scheduler determines the priority of the mobile station further based on a factor for reflecting a minimum reserved traffic rate and a value for reflecting a maximum sustained traffic rate.

* * * * *

UNITED STATES PATENT AND TRADEMARK OFFICE
CERTIFICATE OF CORRECTION

| | | |
|---|---|---|
| PATENT NO. | : 7,616,596 B2 | Page 1 of 1 |
| APPLICATION NO. | : 11/586760 | |
| DATED | : November 10, 2009 | |
| INVENTOR(S) | : Lee et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 339 days.

Signed and Sealed this

Fourteenth Day of December, 2010

David J. Kappos
*Director of the United States Patent and Trademark Office*